US011915695B2

United States Patent
Darling et al.

(10) Patent No.: US 11,915,695 B2
(45) Date of Patent: Feb. 27, 2024

(54) METHOD OF AND A DEVICE FOR USING A WIRELESS RECEIVER AS A HELP-SEEKING-SIGNAL CONVERTER FOR RENDERING HELP USING SMART SPEAKERS

(71) Applicant: INSTANT CARE, INC., San Diego, CA (US)

(72) Inventors: Richard Allen Darling, Poway, CA (US); Fong-Min Chang, Diamond Bar, CA (US); Chih-Cheng Tai, Campbell, CA (US)

(73) Assignee: INSTANT CARE, INC., San Diego, CA (US)

(*) Notice: Subject to any disclaimer, the term of this patent is extended or adjusted under 35 U.S.C. 154(b) by 319 days.

(21) Appl. No.: 17/360,860

(22) Filed: Jun. 28, 2021

(65) Prior Publication Data

US 2022/0020372 A1 Jan. 20, 2022

Related U.S. Application Data

(60) Provisional application No. 63/045,098, filed on Jun. 27, 2020.

(51) Int. Cl.
*G10L 15/22* (2006.01)
*H04M 11/04* (2006.01)

(52) U.S. Cl.
CPC ............. *G10L 15/22* (2013.01); *H04M 11/04* (2013.01); *G10L 2015/223* (2013.01)

(58) Field of Classification Search
CPC ......... G10L 15/22; G10L 15/00; G10L 15/24; G10L 15/26; G10L 2015/0631–0638; G10L 2015/221–228
USPC ...................... 704/270.1, 270, 273, 274, 277
See application file for complete search history.

(56) References Cited

U.S. PATENT DOCUMENTS

| 2007/0123237 A1* | 5/2007 | Cacioppo | H04W 4/18 |
| | | | 455/414.4 |
| 2018/0220469 A1* | 8/2018 | Chen | H04M 3/5116 |
| 2018/0310159 A1* | 10/2018 | Katz | H04W 4/50 |

* cited by examiner

*Primary Examiner* — Qi Han
(74) *Attorney, Agent, or Firm* — Profound Law LLP; Shannon Yi-Shin Yen

(57) ABSTRACT

A Wireless Interface Device and System (WIDS) is used as a bridge device for transmitting, translating, transporting and/or transforming a first emergency aid seeking signal to a second emergency aid seeking signal recognizable by a smart voice commendable device (e.g., AMAZON® ECHO®). The first emergency aid seeking signal can be generated from a Personal Emergency Response Systems (PERS), a fall sensor (e.g., a senior fall sensor), home security monitoring device, or any other emergency aid requesting devices.

14 Claims, 3 Drawing Sheets

200 - Processing Unit

201 - RF Transceiver

202 - RF Antenna

203 - Speaker

204 - Power

METHOD OF AND A DEVICE FOR USING A WIRELESS RECEIVER AS A HELP-SEEKING-SIGNAL CONVERTER FOR RENDERING HELP USING SMART SPEAKERS

CROSS-REFERENCE TO RELATED APPLICATION(S)

This application claims priority under 35 U.S.C. § 119(e) of the U.S. Provisional Patent Application Ser. No. 63/045,098, filed Jun. 27, 2020 and titled, "A Method of and A Device for Using A Wireless Receiver AS A Help-Seeking-Signal Converter for Rendering Help using Smart Speakers," which is also hereby incorporated by reference in its entirety for all purposes.

FIELD OF INVENTION

The present invention relates to a small electronic interface device as a bridge device that receives a wireless signal, processes the signal and rebroadcasts a non-audible high frequency communication or command to a smart speaker, voice command device, or virtual assistant. Specifically the present invention relates to using a voice command device, virtual assistant, or smart speaker such as an AMAZON® ALEXA® to receive a wake word followed by a voice service or command task that when received accesses the list of contacts in a person's cellular phone to contact emergency help. The list can include, but not be limited to a professional emergency response center, 911 call center or family and friends listed as emergency contacts to name a few examples.

BACKGROUND OF THE INVENTION

In today's rapidly aging world, we see a growing number of the U.S. population becoming 65 years of age or older. It is estimated that the senior population will grow by an average of 2.3 million people per year until the year 2030. With this accelerated growth, there are obvious concerns regarding the elderly's ability to maintain an independent quality of life in the comfort of their own homes. As technology advances there have been many new products designed to help aid in independent senior living. Devices called Personal Emergency Response Systems (PERS) are offered to seniors as a way to insure 24 hour, 7 day per week personal safety monitoring in the event of an unforeseen accident or health emergency.

During an emergency these systems can be triggered by means of manually pressing a button on the actual main console itself or can be triggered by using a wireless transmitter.

Unfortunately, some of the equipment used today relies on POTS (Plain Old Telephone Service) or traditional landline phone service. Newer equipment is costly and in general requires installers to make physical visits to users' homes, which adds difficulty and additional costs.

Using newer technology such as smart speakers, voice command, or virtual assistant devices is incredibly helpful, however the requirement of remembering the correct wake and command words can become a hurdle. Another hurdle is when a user is out of "communication range", or possibly being rendered unconscious during an accidental fall or medical emergency. All of these concerns would normally keep a smart speaker device from providing a full proof solution.

SUMMARY OF THE INVENTION

The Present Disclosure provides a device and a system with the ability to receive help through a smart speaker, voice command system, or virtual assistant device without needing to say a word. By triggering a traditional wireless panic or help button, the interface device can send and/or generate wake and command instructions to a smart speaker, voice command, or virtual assistant device to dial a specific number.

The Present Disclosure solves a need for an end-to-end solution that neither require a user to remember key words, nor be within voice communication range, and nor even require verbally commands to communicate at all.

As described above, the Present Disclosure provides a method of and device for receiving wireless communication signals by a Wireless Interface Device and System ("WIDS") that receives, decodes and rebroadcasts a high frequency command (e.g., machine communication signals) or series of commands (e.g., verbal commands) to a smart speaker system that can access a person's personal contacts list stored on a cellphone to place a call for help.

The WIDS (e.g., the interface device) disclosed herein allows a user to take advantage of enhanced lifesaving technology through newer more recognized and acceptable appliances such as a smartphone and smart speaker rather than requiring specific emergency response type systems that have shown to struggle with broad acceptance. When an emergency occurs, the WIDS automatically sends a signal to a base station, emergency console, security panel or any other devices either monitored professionally through a 3$^{rd}$ party central monitoring station or privately through an individual cell phone or any other similar communication devices to alert responders, loved ones etc. so that they are notified help is needed.

As described above, a device utilizes components and software algorithms that can receive wireless signals, decode, and rebroadcast high frequency signals in an optimum manner for a smart speaker to access the users cellphone contact database to contact help in cases of emergency situations is provided in the following detailed description and accompanying drawings illustrate embodiments which are instructive of the various ways in which the principles of the system and method may be employed.

DETAILED DESCRIPTION AND EMBODIMENTS

Figure 1:
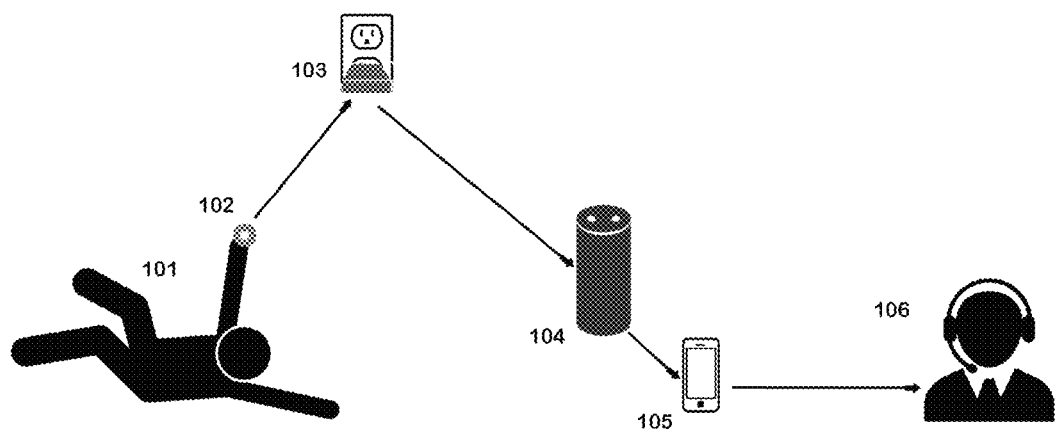
FIG. 1 illustrates a system for rendering help in accordance with some embodiments.

The present invention provides a method of and device for receiving wireless communication signals into a wireless interface device and system (WIDS) that can receive, decode and rebroadcast a high frequency command or series of commands to a smart speaker system that can access a person's personal contacts list stored on a cellphone to place a call for help.

The wireless interface device receives in wireless signals from transmitters used in but not limited to typical life safety products such as panic buttons, help buttons, fall sensors and other similar wireless devices used to address sudden emergencies in the service known as the Personal Emergency Response Industry. The buttons or devices can use a wide range of wireless technology currently known or not yet developed. Current methods include, but are not limited to Sub-Gigabit RF, BlueTooth, BLE, Z-Wave, and Zigbee to name just a few.

In some embodiments, a microprocessor is used to process an incoming wireless signal, and hand it off to a what is known as an audio sound transducer for converting the signal into a high frequency "Wake Command" followed by an "Action Command" for a smart speaker, wireless communication system, voice command device, or virtual assistant located in communication range of the wireless device to access a person's smartphone and dial out a preset phone number or numbers to address an unforeseen or sudden emergency.

In one embodiment, the WIDS is used to address an unforeseen Personal emergency where the user activates a wireless RF pendant or other similar type device worn on the person's body such as a Fall Detector or similar. The RF Pendant or peripheral transmits a known RF protocol to the interface device (WIDS), which in turn broadcasts a high frequency message or verbal commands to a smart speaker such as an AMAZON® Echo speaker or similar communicator.

In yet another embodiment, the wireless interface device (WIDS) is used to address an unforeseen security breach of a home security system where the security control panel transmits from the security control panel a known RF protocol to the interface device (WIDS), which in turn the WIDS broadcasts a high frequency message to a smart speaker such as an AMAZON® Echo speaker or similar communicator.

In yet another embodiment, the wireless interface device (WIDS) is used to address an unforeseen security breach of a home security system where a wireless transmitter is wired into the security control panel and transmits a known RF protocol to the interface device (WIDS), which in turn broadcasts a high frequency message to a smart speaker, such as a Amazon Echo speaker or similar communicator.

In yet another embodiment, a human worn transmitter would send biorhythm data to the wireless interface device (WIDS). The device would then process the biorhythm data and send a wake command and following action commands to the communication system, voice command device, or virtual assistant to address the biorhythm information. The biorhythm information may be related to but not limited to concerns of a sudden rise in body temperature, a sudden rise or decline in blood pressure, a sudden appearance of body perspiration, a sudden heartbeat irregularity, and a drop or rise in blood sugar, etc.

The biorhythm information could automatically send a communication request through the wireless interface to a smart speaker, voice command device, or virtual assistant that would then contact a preprogrammed response service, such as a medical center, nurse triage, medical practitioner, hospital, pharmacy, caretaker, care provider, loved one or any persons responsible for monitoring a person's medical or heath conditions.

In yet another embodiment, wireless peripherals throughout a home such as temperature thermostats, lights or light switches, speakers, appliances, or similar may communicate system information to the communication interface. The information could them be sent through the wireless interface (WIDS) to a smart speaker, voice command device, or virtual assistant that could then adjust, modify, correct or otherwise interact with the communicating peripheral.

In yet another embodiment, wireless peripherals throughout a home such as temperature thermostats, lights or light switches, speakers, appliances, or similar may communicate system information to the wireless interface (WIDS). The information could them be sent through the wireless interface to a smart speaker, voice command device, or virtual assistant that could communicate with an outside system maintenance provider or technician to address the appliance needs or concerns.

In yet another embodiment, wireless safety peripherals such as wireless emergency sensors or fall detection sensors could be used to monitor a user's steps, gait, or any other motion that could aid in detecting or predicting potential accidental falls. This information could be sent to a smart speaker, voice command device, or virtual assistant via WIDS and allow the device to annunciate warnings to the user as well as send warnings to a monitoring center, care providers, family etc. distal to the user to alert them of the potential fall concerns and allowing them to take corrective actions.

In another embodiment, the use of high frequency communication via WIDS can be used to alert a smart speaker, voice command device, or virtual assistant of emergency and non-emergency events when common environmental or ambient household audio rises to a level where a smart speaker, voice command device, or virtual assistant may have difficultly detecting a human voice, but is capable of detecting wake and command words transmitted at high frequency levels.

In another embodiment, the wireless communication device (e.g., the WIDS) could be used to transmit high frequency communication alerts to a smart speaker, voice command device, or virtual assistant when emergency and non-emergency events occur during times when environmental audio levels created by but not limited to such things as business machines, city traffic, airplanes, sirens, etc. are at a level where a smart speaker, voice command device, or virtual assistant may have difficultly detecting normal audio commands within standard human hearing frequencies, but is capable of detecting wake and command words transmitted at high frequency levels.

In one embodiment, the wireless communication device (e.g., the WIDS) is battery powered. In another embodiment the wireless communication device (e.g., the WIDS) is powered by standard external power adapter. In yet another embodiment, the wireless communication device (e.g., the WIDS) is powered by both battery and external power depending on system configuration. In yet another embodiment, the wireless communication device (e.g., the WIDS) contains a backup battery supply that activates when primary external power is lost.

In another embodiment, the wireless communication device (e.g., the WIDS) receives commands from the smart speaker, voice command device, or virtual assistant to update the wireless communication device software. In another embodiment, the wireless communication device receives commands from the smart speaker, voice command device check on devices throughout a home, office, etc., and report the status of devices, systems, or any other apparatus to the smart speaker, voice command device, or virtual assistant.

FIG. 1 illustrates a person that has fallen to the ground and needs help (101). In the persons hand comprises a portable wireless device (102) that when activated transmits a wireless signal to small electronic interface device (103) (e.g., WIDS) for receiving, decoding, processing, then broadcasts commands via a high frequency transmission to a smart speaker (104) (e.g., AMAZON® ECHO®) that upon receiving the high frequency commands access the contact database of users' smart phone (105) and dials out a preset emergency call number that contacts an operator at an emergency response call center (106). In some embodiments, the small electronic interface device (103) (e.g., WIDS) communicate with the users smart phone (105) similar to the communication between the smart speaker (104) and WIDS (103).

In some embodiments, the WIDS (103) provide a function as human voice extender. A user is able to in a location that normally his/her voice commands cannot be directly received by the smart speaker (104). Thus, the wearing portable wireless device (102) is able to transmit aid seeking signals to the WIDS, and the WIDS generate the smart speaker (104) recognizable signals for the smart speaker to send aid seeking signals to a remote location (e.g., 911, call center) or a designated person for help. The recognizable signals can be verbal command or machine communicable signals (e.g., high pitch signals that is not audible by human ear or not able to be contextually understandable by human).

Figure 2:
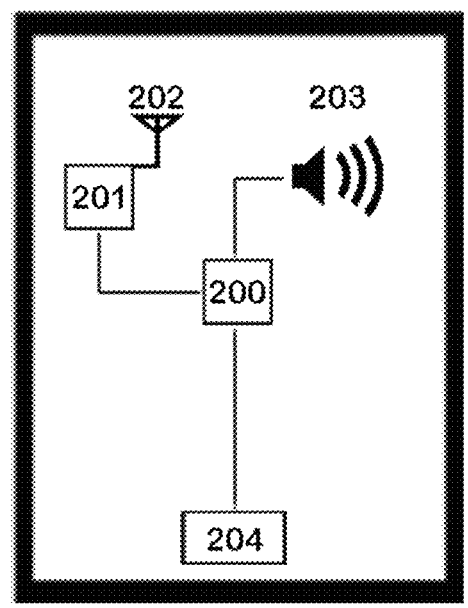
FIG. 2 illustrates a help rendering device in accordance with some embodiments.

FIG. 2 illustrates a small electronic device containing a wireless receive antenna (202) for receiving wireless signals, a receiver (201) for receiving the wireless data, a processor (200) for processing and converting the data into high frequency sound waves, and an audio output transducer speaker (203) for broadcasting the high frequency command messages to a smart speaker. The portable small electrical device is powered by a standard 110V connection (204). The device may include a replaceable battery in the future in accordance with some embodiments.

Figure 3:
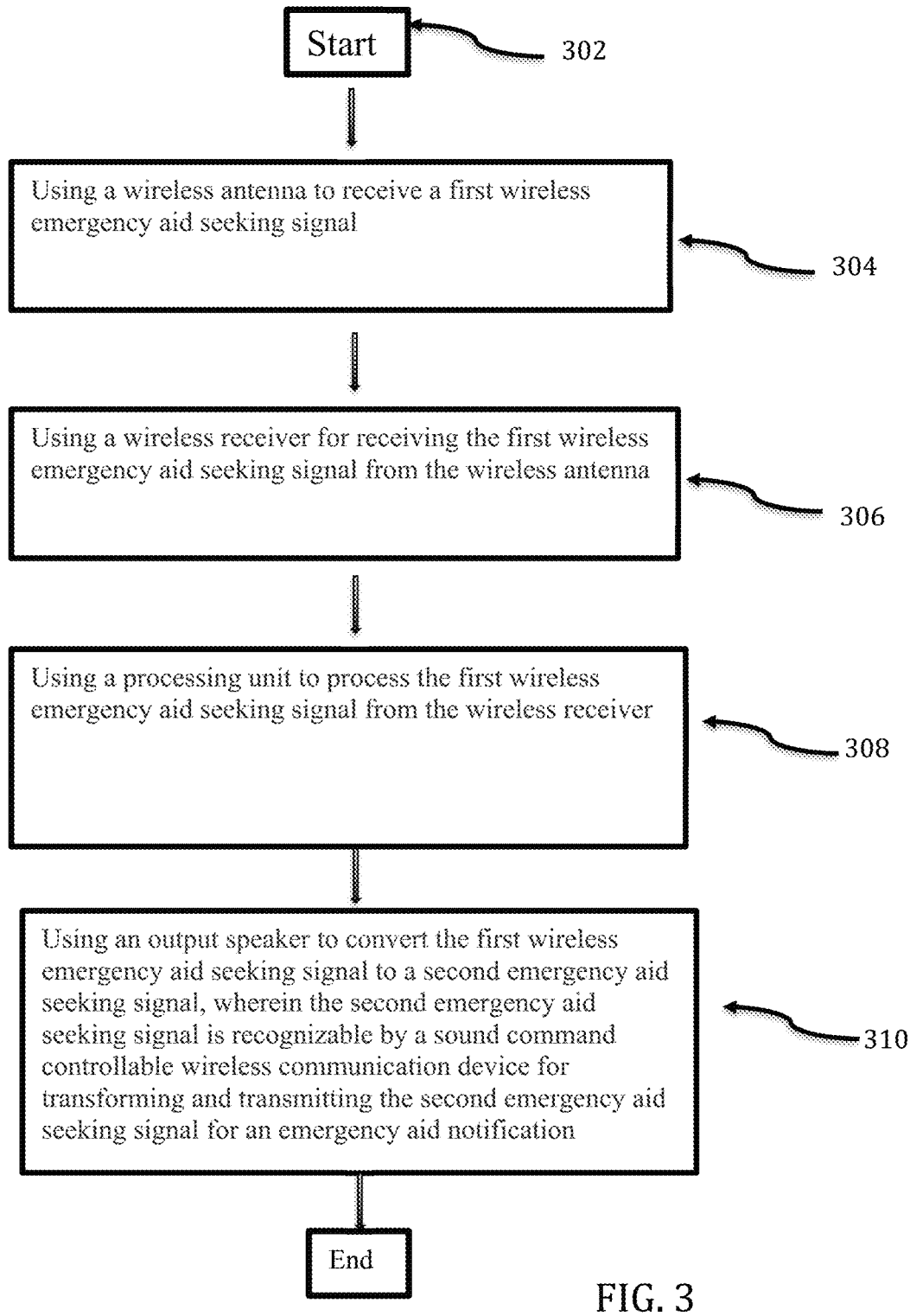
FIG. 3 illustrates a wireless communicating method 300 in accordance with some embodiments.

FIG. 3 illustrates a wireless communicating method 300 in accordance with some embodiments. The method 300 can start at a Step 302. At a Step 304, a wireless antenna is used to receive a first wireless emergency aid seeking signal. At a Step 306, a wireless receiver is used for receiving the first wireless emergency aid seeking signal from the wireless antenna. At a Step 308, a processing unit is used to process the first wireless emergency aid seeking signal from the wireless receiver. At a Step 310, an output speaker is used to convert the first wireless emergency aid seeking signal to a second emergency aid seeking signal, wherein the second emergency aid seeking signal is recognizable by a sound command controllable wireless communication device for transforming and transmitting the second emergency aid seeking signal for an emergency aid notification.

In utilization and operation, the WIDS solves the problems including that the user's voice range is too far from the smart voice commendable device, the background noise level is too high or interference is too high that the smart voice commendable device cannot easily recognize an emergency aid is requested by voice, the user is in an isolated or highly private space (e.g., bathroom or restroom) that smart voice commendable device is generally not installed therewithin, or when the user is weak or become weak at a particular situation making requesting an emergency aid via the smart voice commendable device inconvenient or impractical.

What is claimed is:

1. A wireless communication device comprising:
    a) a wireless antenna for receiving a first wireless emergency aid seeking signal;
    b) a wireless receiver for receiving the first wireless emergency aid seeking signal from the wireless antenna;
    c) a processing unit for processing the first wireless emergency aid seeking signal from the wireless receiver; and
    d) an output speaker for converting the first wireless emergency aid seeking signal to a second emergency aid seeking signal, wherein the second emergency aid seeking signal is recognizable by a sound command controllable wireless communication device for transforming and transmitting the second emergency aid seeking signal for an emergency aid notification,
    wherein the second emergency aid seeking signal is transmitted using high frequency sound waves beyond a human voice frequency.

2. The wireless communication device of claim 1, wherein the high frequency sound waves comprise wake commands directed to a wireless communication system, a voice command device, or a virtual assistant device.

3. The wireless communication device of claim 1, wherein the high frequency sound waves comprise action commands instructing a wireless communication system, voice command device, or a virtual assistant device to perform an action.

4. The wireless communication device of claim 3, wherein the action comprises instructing the wireless communication system, voice command device, or a virtual assistant device to access a cellular phone list and dial a phone number or numbers.

5. The wireless communication device of claim 1, wherein the sound command controllable wireless communication device comprises a smart speaker.

6. The wireless communication device of claim 1, wherein the sound command controllable wireless communication device comprises a voice commendable device.

7. The wireless communication device of claim 1, wherein the sound command controllable wireless communication device comprises virtual assistant device.

8. A wireless communicating method comprising:
    a) using a wireless antenna to receive a first wireless emergency aid seeking signal;
    b) using a wireless receiver for receiving the first wireless emergency aid seeking signal from the wireless antenna;
    c) using a processing unit to process the first wireless emergency aid seeking signal from the wireless receiver; and
    d) using an output speaker to convert the first wireless emergency aid seeking signal to a second emergency aid seeking signal, wherein the second emergency aid seeking signal is recognizable by a sound command controllable wireless communication device for transforming and transmitting the second emergency aid seeking signal for an emergency aid notification,
    wherein the second emergency aid seeking signal is transmitted using high frequency sound waves beyond a human voice frequency.

9. The wireless communicating method of claim 8, wherein the high frequency sound waves comprise wake commands directed to a wireless communication system, a voice command device, or a virtual assistant device.

10. The wireless communicating method of claim 8, further comprising using action commands to instruct a wireless communication system, voice command device, or a virtual assistant device to perform an action.

11. The wireless communicating method of claim 10, further comprising instructing the wireless communication system, voice command device, or a virtual assistant device to access a cellular phone list and dial a phone number or numbers.

12. The wireless communicating method of claim 8, wherein the sound command controllable wireless communication device comprises a smart speaker.

13. The wireless communicating method of claim 8, wherein the sound command controllable wireless communication device comprises a voice commendable device.

14. The wireless communicating method of claim 8, wherein the sound command controllable wireless communication device comprises a virtual assistant device.

* * * * *